United States Patent Office 3,029,260
Patented Apr. 10, 1962

3,029,260
3,17,20-TRIOXYGENATED 6β-CHLORO-5-METHYL-
19-NOR-5β-PREGN-9-ENES
Joseph S. Mihina, Skokie, Ill., assignor to G. D. Searle & Co., Chicago, Ill., a corporation of Delaware
No Drawing. Filed Aug. 23, 1960, Ser. No. 51,293
6 Claims. (Cl. 260—397.4)

This invention relates to 3,17,20-trioxygenated 6β-halo-5-methyl-19-nor-5β-pregn-9-enes and processes for the manufacture thereof. More particularly, this invention relates to chemical compounds of the formula

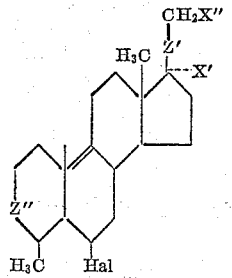

wherein Hal represents halogen; at least one of the symbols X' and X" represents a hydroxy or alkanoyloxy (—OCOR) radical and the other represents hydrogen or a hydroxy or alkanoyloxy radical; and Z' and Z" each represent a carbonyl (>CO), hydroxymethylene (>CHOH)

or alkanoyloxymethylene (>CHOCOR) radical, R in the parenthetical formulas standing for an alkyl radical.

Among the halogens represented by Hal, especially those having an atomic number less than 53—which is to say fluorine, chlorine, and bromine—are preferred. The alkanoyloxy and alkanoyloxymethylene radicals represented by X', X", Z', and Z" are best adapted to the purposes of this invention when the alkyl constituent (R) is of lower order; and the hydroxymethylene and alkanoyloxymethylene radicals comprehended by Z" are desirably in the β configuration. Lower alkyl radicals include methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ aggregates wherein $n$ is a positive integer amounting to less than 9. Alkanoyloxy and alkanoyloxymethylene radicals of the preferred type are hereinafter referred to as lower alkanoyloxy and lower alkanoyloxymethylene radicals, respectively. Those skilled in the art will recognize that when X', X", Z', and Z" designate such radicals, the compounds contemplated are esters of the alcohols depicted when the symbols referred to designate hydroxy and/or hydroxymethylene radicals.

The products of this invention are useful because of their valuable pharmacological properties. Thus, for example, they are eurhythmic agents; and they inhibit the incorporation of mevalonic acid in the biosynthesis of cholesterol. The intermediates whence these products are obtained—especially, 3β,(17α and/or 21)-polyalkanoyloxy - 6β - halo - 5-hydroxy-5α-pregnan-20-ones—are, of course, likewise useful.

Manufacture of the subject compositions proceeds from the aforesaid 3β,(17α and/or 21)-polyalkanoyloxy-6β-halo-5-hydroxy-5α-pregnan-20-ones and parent alcohols

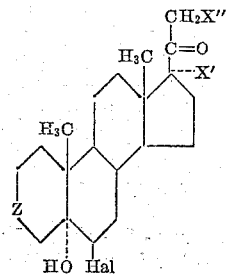

wherein Z represents a hydroxymethylene or alkanoyloxymethylene radical and Hal, X', and X" are defined as before, by heating such compounds, concurrently or seriatim, under appropriate esterifying and dehydrating conditions—for example, with an alkanoic acid anhydride in the presence of potassium acid sulfate or sulfuric acid, and with a corresponding alkanoic acid added to increase solubility if desired. The esters which result are completely saponified in aqueous alcoholic caustic after 4 hours; alternatively, when allowed to stand for up to 2 hours at room temperatures with merely 1 or 2 equivalents of alkali carbonate, they afford mixtures of mono- or diesters, respectively, separable by chromatography on silica gel, using benzene and ethyl acetate as developing solvents. From the 3-hydroxy compounds so produced, on oxidation with chromium trioxide in a heterogeneous medium comprising aqueous acetic acid and an inert solvent for the steroid present, the corresponding 3-ones are obtained. The 20-ols of the invention derive from corresponding 20-ones via lithium aluminum hydride in tetrahydrofuran at the boiling point.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations, observed at 26° centigrade, refer to the D line of sodium.

EXAMPLE 1

A. *17α-Acetoxy-5,6α-epoxy-3β-hydroxy-5α-pregnan-20-one.*—To a solution of 100 parts of 17α-acetoxy-3β-hydroxypregn-5-en-20-one and 5 parts of sodium acetate in 4450 parts of benzene at 10° is added a solution of approximately 43 parts of perbenzoic acid in 525 parts of benzene. The resultant mixture is allowed to warm to room temperature, whereupon it is washed with aqueous 5% sodium bicarbonate and then to neutrality (until the washings are neutral to litmus) with water. Solvent is removed by vacuum distillation, and the residue is crystallized from a mixture of acetone and ethyl acetate. The 17α - acetoxy-5,6α-epoxy-3β-hydroxy-5α-pregnan-20-one thus obtained melts at approximately 249–250° and has a specific rotation of −70.8° in 1.010% chloroform solution.

B. *3β,17α - Diacetoxy-6β-chloro-5-hydroxy-5α-pregnan-*

20-one.—A mixture of 56 parts of 17α-acetoxy-5,6α-epoxy-3β-hydroxy-5α-pregnan-20-one, 830 parts of 37% hydrochloric acid, and 2000 parts of dichloromethane is maintained with vigorous agitation for 15 minutes at room temperatures, then diluted with 1900 parts of water. The dichloromethane phase is separated and consecutively washed with aqueous 10% sodium bicarbonate and water, the water wash being continued until the washings are neutral to litmus. The resultant dichloromethane solution is dried over anhydrous sodium sulfate and stripped of solvent by vacuum distillation.

The residue is heated at 100–120° with 350 parts of acetic anhydride for 1 hour, then dumped into water. After 2 hours, the precipitate which forms is filtered off, washed on the filter with water, and dried in air. Crystallized from ethyl acetate, it melts at 200–202° and is further characterized by a specific rotation of −45.8° in 1.003% chloroform solution. The material thus obtained is 3β,17α-diacetoxy-6β-chloro-5-hydroxy-5α-pregnan-20-one.

C. *3β,17α - Diacetoxy - 6β - chloro-5-methyl-19-nor-5β-pregn-9-en-20-one*.—A mixture of 56 parts of 17α-acetoxy-5,6α-epoxy-3β-hydroxy-5α-pregnan-20-one, 830 parts of 37% hydrochloric acid, and 2000 parts of methylene chloride is processed as described in the first paragraph of the foregoing part B of this example and the residue is heated at 100–120° with 350 parts of acetic anhydride for 1 hour, whereupon approximately 13 parts of powdered potassium acid sulfate is introduced. The mixture thus obtained is heated at 40–50° for 1 hour and then poured into 2000 parts of aqueous 5% sodium chloride. After 2 hours, the resultant mixture is extracted with ethyl acetate; and the acetate extract is washed with aqueous 10% sodium bicarbonate and then to neutrality with water. The extract is then dried over anhydrous sodium sulfate and concentrated by vacuum distillation to the point of incipient turbidity (approximately ⅛ its original volume). From the concentrate, on chilling and standing, there is precipitated 3β,17α-diacetoxy-6β-chloro-5-methyl-19-nor-5β-pregn-9-en-20-one, melting at approximately 186–187° and with a specific rotation at 25° of +132.8° in 1.005% chloroform solution. The product has the formula

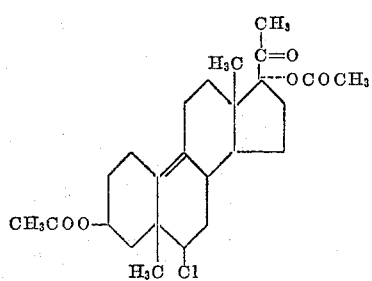

D. *3β,17α - Diacetoxy - 6 - chloropregn-5-en-20-one and 3β,17α - diacetoxy - 6β - chloropregn - 4-en-20-one*.—The mother liquor remaining after isolation of 3β,17α-diacetoxy-6β-chloro-5-methyl-19-nor-5β-pregn-9-en-20 - one in the foregoing part C of this example is stripped of solvent by vacuum distillation, and the residue is taken up in benzene. The benzene solution is chromatographed on silica gel, using benzene and ethyl acetate as developing solvents. From eluates comprising 19 parts of benzene for each part of ethyl acetate present there are obtained, on evaporation of solvent, 3β,17α-diacetoxy-6-chloropregn-5-en-20-one and 3β,17α-diacetoxy-6β-chloropregn-4-en-20-one, respectively, the latter product being somewhat more firmly retained on the silica gel than the former. Recrystallized from a mixture of methanol and ethanol, 3β,17α-diacetoxy-6-chloropregn-5-en-20-one melts at approximately 208–209° and has a specific rotation of −79° in 1.014% chloroform solution. The product has the formula

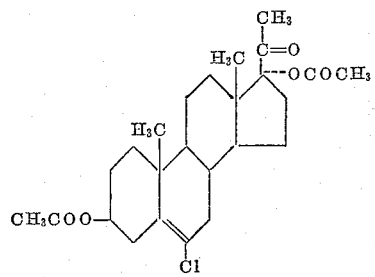

Likewise recrystallized from a mixture of methanol and ethanol, 3β,17α - diacetoxy - 6β - chloropregn-4-en-20-one melts at 159–161° and has a specific rotation of +27° in 1.007% chloroform solution. This product has the formula

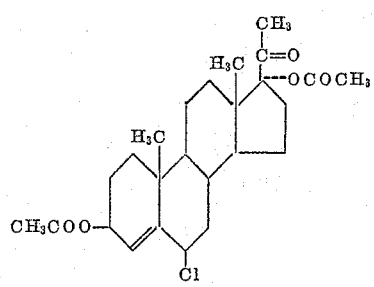

These two products manifest valuable progestational activity.

EXAMPLE 2

*6β-Chloro-3β,17α-dihydroxy-5-methyl-19-nor-5β-pregn-9-en-20-one*.—To a solution of 4 parts of 3β,17α-diacetoxy - 6β - chloro - 5 - methyl - 19 - nor - 5β - pregn-9 - en - 20 - one in 118 parts of methanol is added a solution of approximately 5 parts of potassium hydroxide in 15 parts of water. The resultant mixture is allowed to stand at room temperatures for 4 hours, then diluted with 10 parts of 37% hydrochloric acid in 2000 parts of water. The precipitate thrown down is filtered off, washed on the filter with water, and dried in air. Recrystallized from methanol, it melts at 187–189° and is further characterized by a specific rotation of +154° in 1.002% chloroform solution. This material is 6β-chloro-3β,17α-dihydroxy-5-methyl-19-nor-5β-pregn-9-en-20-one, of the formula

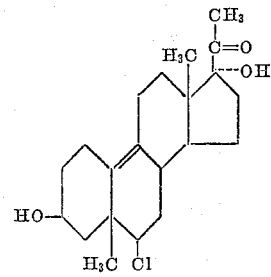

EXAMPLE 3

*6β - Chloro - 17α - hydroxy - 5 - methyl - 19 - nor - 5β-pregn - 9 - ene - 3,20 - dione*.—To a solution of approximately 2 parts of 6β-chloro-3β,17α-dihydroxy-5-methyl-19-nor-5β-pregn-9-en-20-one in 66 parts of benzene and 79 parts of acetic acid is added, with agitation, a solution of approximately 1 part of chromium trioxide in 10 parts of water. Agitation is continued for 5 hours, whereupon 1 part of sodium sulfite is mixed in. The benzene phase is separated and washed, first with aqueous 10% sodium bicarbonate and then to neutrality with water. The resultant benzene solution is dried over anhydrous sodium sulfate and stripped of solvent by vacuum distillation.

The residue, crystallized from 95% ethanol, affords 6β-chloro - 17α - hydroxy - 5 - methyl - 19 - nor - 5β - pregn-9 - ene - 3,20 - dione, melting at 193–195° and with a specific rotation of +91° in 1.002% chloroform solution. The product has the formula

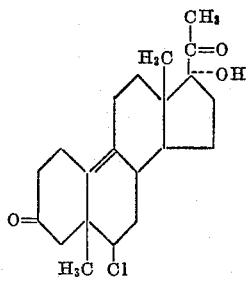

EXAMPLE 4

*6β - Chloro - 5 - methyl - 5β - pregn - 9 - ene - 3β,17α,-20 - triol.*—To a slurry of 1 part of lithium aluminum hydride in 50 parts of pure tetrahydrofuran is slowly added, at room temperatures, 2 parts of 3β,17α-diacetoxy-6β-chloro-5-methyl-19-nor-5β-pregn-9-en-20-one dissolved in 50 parts of pure tetrahydrofuran. The resultant mixture is heated at the boiling point under reflux for 1½ hours, whereupon it is cooled to 5°, at which temperature cracked ice is introduced to decompose excess lithium aluminum hydride. Approximately 60 parts of 10% hydrochloric acid is then added, followed by 200 parts of water. The mixture thus obtained is extracted with isopropyl acetate. The acetate extract is washed to neutrality with water, dried over anhydrous sodium sulfate, and stripped of solvent by vacuum distillation. The residue, crystallized from ethyl acetate, affords 6β-chloro-5-methyl-5β-pregn-9-ene-3β,17α,20-triol, melting at approximately 174–175° and with a specific rotation of +142° in 0.5% chloroform solution. The product has the formula

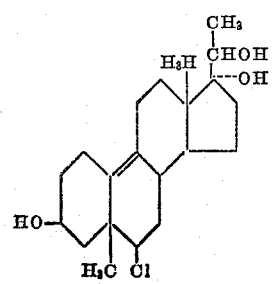

The mother liquor remaining after crystallization of the foregoing 6β-chloro-5-methyl-5β-pregn-9-ene-3β,17α,-20-triol, distilled to dryness in vacuo, affords a residue which, chromatographed in benzene solution on silica gel, using benzene and ethyl acetate as developing solvents, yields the 20-epimer of the aforesaid product.

What is claimed is:
1. A compound of the formula

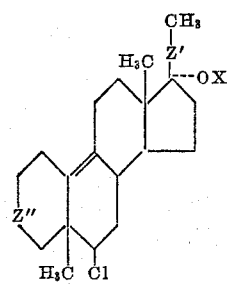

wherein X represents a member selected from the class consisting of hydrogen and lower alkanoyl radicals; and Z′ and Z″ each represent a member selected from the class consisting of carbonyl, hydroxymethylene, and lower alkanoyloxymethylene radicals, the hydroxy and lower alkanoyloxy constituents of the radicals represented by Z″ being in the β configuration, and the selection of Z′ and Z″ being such that when Z″ represents a carbonyl radical Z′ unexceptionably represents a carbonyl radical also.

2. 3β,17α - Diacetoxy - 6β - chloro - 5 - methyl - 19-nor - 5β - pregn - 9 - en - 20 - one.
3. 6β - Chloro - 3β,17α - dihydroxy - 5 - methyl - 19-nor - 5β - pregn - 9 - en - 20 - one.
4. 6β - Chloro - 17α - hydroxy - 5 - methyl - 19 - nor-5β - pregn - 9 -ene - 3,20 - dione.
5. 6β - Chloro - 5 - methyl - 5β - pregn - 9 - ene-3β,17α,20 - triol.
6. 3β,17α - Diacetoxy - 6β - chloro - 5 - hydroxy - 5α-pregnan - 20 - one.

No references cited.

UNITED STATES PATENT OFFICE
CERTIFICATE OF CORRECTION

Patent No. 3,029,260                                April 10, 1962

Joseph S. Mihina

It is hereby certified that error appears in the above numbered patent requiring correction and that the said Letters Patent should read as corrected below.

Column 1, lines 14 to 25, the formula should appear as shown below instead of as in the patent:

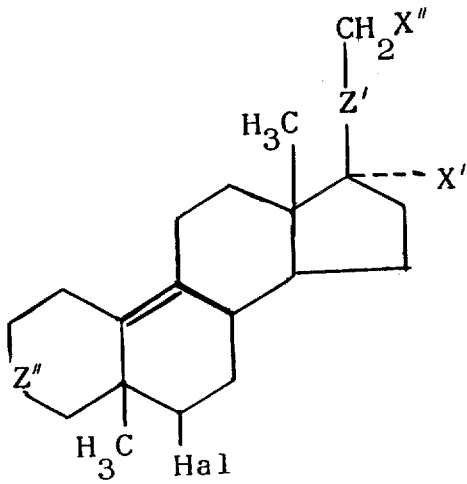

Signed and sealed this 11th day of December 1962

(SEAL)
Attest:
ERNEST W. SWIDER
Attesting Officer

DAVID L. LADD
Commissioner of Patents